(12) United States Patent
Zhang et al.

(10) Patent No.: US 11,479,186 B2
(45) Date of Patent: Oct. 25, 2022

(54) AUTOMOBILE AIR-INLET GRILLE SEALING STRIP WITH SOFT HOLLOW STRUCTURE

(71) Applicant: Qinhuangdao Great Wall Glass Industry Co., Ltd., Qinhuangdao (CN)

(72) Inventors: Wanwu Zhang, Hebei (CN); Zhenquan Ou, Hebei (CN); Haitao Wu, Hebei (CN)

(*) Notice: Subject to any disclaimer, the term of this patent is extended or adjusted under 35 U.S.C. 154(b) by 0 days.

(21) Appl. No.: 17/603,013

(22) PCT Filed: Mar. 12, 2021

(86) PCT No.: PCT/CN2021/080561
§ 371 (c)(1),
(2) Date: Oct. 12, 2021

(87) PCT Pub. No.: WO2021/244096
PCT Pub. Date: Dec. 9, 2021

(65) Prior Publication Data
US 2022/0266769 A1   Aug. 25, 2022

(30) Foreign Application Priority Data
Jun. 2, 2020   (CN) .......................... 202010488980.X

(51) Int. Cl.
*B60R 13/06*     (2006.01)
*B60J 10/24*     (2016.01)
(Continued)

(52) U.S. Cl.
CPC .......... *B60R 13/06* (2013.01); *B60R 13/0892* (2013.01); *B60J 10/24* (2016.02); *B60J 10/74* (2016.02); *B60J 10/84* (2016.02)

(58) Field of Classification Search
CPC ... B60J 10/24; B60J 10/74; B60J 10/75; B60J 10/767; B60J 10/77; B60J 10/84;
(Continued)

(56) References Cited

U.S. PATENT DOCUMENTS 2,498,851 A * 2/1950 Doty ................. B60J 10/30
                                                49/495.1
2,737,412 A * 3/1956 Smith ................ B60J 10/24
                                                49/498.1
(Continued)

FOREIGN PATENT DOCUMENTS

CN          1764557 A       4/2006
CN        100404296 C       7/2008
(Continued)

OTHER PUBLICATIONS

International search report of PCT/CN2020/120143.
First Office action of Chinese application: CN 202010488980.X.
Notification to Grant Patent Right.

*Primary Examiner* — Phi D A

(57) ABSTRACT

An automobile air-inlet grille sealing strip with a soft hollow structure, including: a clamping strip and a soft structure. The clamping strip includes a strip-shaped member and a U-shaped groove. The strip-shaped member and the U-shaped groove are integrally formed, and the U-shaped groove includes a curved arm, a first straight arm and a second straight arm arranged at two ends of the curved arm. The inner side of the second straight arm is provided with a relatively inclined smooth transitional curved surface. The U-shaped groove extends outward along an opening direction of the second straight arm. The soft structure is arranged on the inner side of the second straight arm, the soft structure is in a long strip shape and is provided with a through hole close to the first end of the curved arm.

16 Claims, 3 Drawing Sheets

(51) Int. Cl.
*B60J 10/74* (2016.01)
*B60R 13/08* (2006.01)
*B60J 10/84* (2016.01)

(58) Field of Classification Search
CPC .............. B60J 10/85; B60R 2013/0807; B60R 13/0892; B60R 13/06
See application file for complete search history.

(56) References Cited

U.S. PATENT DOCUMENTS

| | | | | |
|---|---|---|---|---|
| 4,653,801 | A | * | 3/1987 | Shirasu .................... B60R 13/06 296/213 |
| 5,024,480 | A | * | 6/1991 | Petrelli .................... B60J 10/86 296/210 |
| 5,050,349 | A | * | 9/1991 | Goto ....................... B60J 10/773 49/489.1 |
| 2002/0036414 | A1 | * | 3/2002 | Nozaki .................... B60J 10/265 49/498.1 |
| 2002/0112405 | A1 | * | 8/2002 | Nozaki .................... B60J 10/84 49/492.1 |
| 2008/0197675 | A1 | * | 8/2008 | Nolles ..................... B60J 10/24 296/215 |
| 2018/0009301 | A1 | * | 1/2018 | Kobayashi ............... B60J 10/77 |
| 2018/0154751 | A1 | * | 6/2018 | Berndt .................... B60J 10/233 |
| 2019/0084394 | A1 | * | 3/2019 | Coria ...................... B60J 10/82 |
| 2021/0300164 | A1 | * | 9/2021 | Kumar .................... B60J 10/45 |
| 2021/0331568 | A1 | * | 10/2021 | Nishikawa ............... B60J 10/22 |

FOREIGN PATENT DOCUMENTS

| | | | | |
|---|---|---|---|---|
| CN | 104890483 | A | | 9/2015 |
| CN | 106114169 | A | | 11/2016 |
| CN | 111452736 | A | | 7/2020 |
| CN | 212386288 | U | | 1/2021 |
| DE | 102004055567 | A1 | * | 2/2006 ........... B60J 10/248 |
| DE | 102005033276 | B3 | * | 10/2006 .......... B60J 10/248 |
| DE | 202016107429 | U1 | | 3/2018 |
| DE | 2020161074239 | U1 | | 3/2018 |
| DE | 202018107370 | U1 | | 3/2020 |
| FR | 3043951 | A1 | * | 5/2017 ....... B32B 17/10036 |
| JP | 2006224698 | A | * | 8/2006 ............. B60J 10/24 |
| JP | 2017039388 | A | * | 2/2017 ........... B60J 10/248 |
| WO | WO-2013120671 | A1 | * | 8/2013 ............... B60J 1/02 |
| WO | WO-2017089702 | A1 | * | 6/2017 ....... B32B 17/10036 |
| WO | WO-2018178573 | A1 | * | 10/2018 ....... B32B 17/10036 |

* cited by examiner

AUTOMOBILE AIR-INLET GRILLE SEALING STRIP WITH SOFT HOLLOW STRUCTURE

TECHNICAL FIELD

The application relates to the field of automobile sealing element, and particularly relates to an automobile air-inlet grille sealing strip with a soft hollow structure.

BACKGROUND

At present, the clamping strip structure is widely used in the connection of installation of automobile air-inlet grille and front windshield, and this structure can obtain a better appearance matching effect. The matching relationship between the traditional clamping strip structure and the surrounding parts is: the clamping strip is provided with a metal skeleton, the clamping foot of the air-inlet grille is clamped to the clamping strip through a barb of the clamping strip, and the clamping strip is bonded to the front windshield by adhesive tape.

In the prior art, the air-inlet grille connected by the clamping strip structure is easy to get out of the clamping strip structure, and the air-inlet grille and the barb of the clamping strip cannot be completely fitted. There will be a gap between the air-inlet grille and the clamping strip, which is prone to problems such as water leakage, noise, abnormal sound, etc.

SUMMARY

For this reason, the present application provides an automobile air-inlet grille sealing strip with a soft hollow structure, which solves the problems of large gap between the air-inlet grille and the front windshield, noise and abnormal sound in the prior art.

In order to achieve the above objective, the present application provides an automobile air-inlet grille sealing strip with a soft hollow structure, including: a clamping strip and a soft structure, the clamping strip comprises a strip-shaped member and a U-shaped groove; the strip-shaped member and the U-shaped groove are integrally formed; the U-shaped groove includes a curved arm, a first straight arm and a second straight arm; the first straight arm and the second straight arm are arranged at two ends of the curved arm respectively; an inner side of the second straight arm is provided with a relatively inclined smooth transitional curved surface, and the U-shaped groove extends outward along an opening direction of the second straight arm; the soft structure is provided at the inner side of the second straight arm, the soft structure is in a long strip shape, and the soft structure is provided with a through hole on a first end close to the curved arm;

the soft structure includes a first clamping foot contact part, a second clamping foot contact part, a smooth transition part and a grille contact part; a starting point of the first clamping foot contact part is A, a connection point of the first clamping foot contact part and the second clamping foot contact part is B, a connection point of the second clamping foot contact part and the smooth transition part is C, a connection point of the smooth transition part and the grille contact part is D, an end point of the grille contact part is E; cross-sections of the first clamping foot contact part, the second clamping foot contact part, and the grille contact part are all arc-shaped, and a cross-section of the smooth transition part is a straight line; the first clamping foot contact part is provided with a damping layer, and the second clamping foot contact part is provided with a wear-resistant layer.

Further, a curve formula of the first clamping foot contact part is $$Y1 = a0 \times \ln\frac{d6}{d3} + \sin\left(\alpha + \frac{d}{d1}\right) + x0 + y0,$$

d6 is a contactable length between a clamping foot of the air-inlet grille and the soft structure, d3 is a width of the U-shaped groove, and $\alpha$ is an angle between a straight line formed by two end points of the first clamping foot contact part and a horizontal plane, and d is a thickness of the damping layer, d1 is a thickness of the air-inlet grille; a0 is a constant coefficient, and x0 and y0 are both constants; a curve formula of the second clamping foot contact part is $$Y2 = \log\frac{d4}{f}\left(\frac{d3}{d4} + \cos\left(\beta + \frac{d4}{f}\right)\right) + x1 + y1,$$

d4 is a longest horizontal width of the clamping foot; f is a thickness of the wear-resistant layer; d3 is a width of the U-shaped groove; $\beta$ is an angle between a straight line formed by two end points of the second clamping foot contact part and the horizontal plane, x1 and y1 are both constants; a straight line formula of the smooth transition part is Y3=d1*x+k, d1 is a thickness of the air-inlet grille, x takes a value of 0.1-0.5, and k is a constant; a curve formula of the grille contact part is $$Y4 = \log\frac{dr}{d1}\left(\frac{d1}{d5} + \frac{p1}{p0}\right),$$

dr is a straight-line distance between D and E, d1 is a thickness of the air-inlet grille, d5 is a width of the soft structure, p1 is an actual elastic modulus of a soft structure material, and p0 is a preset elastic modulus Further, the wear-resistant layer is arranged on a first side of the first end, and the damping layer is arranged on a second side of the first end, and the second side and the first side are arranged opposite to each other.

Further, the automobile air-inlet grille sealing strip with a soft hollow structure further includes a first soft body; the first soft body is in along sheet shape and arranged on an outer side of the curved arm.

Further, the automobile air-inlet grille sealing strip with a soft hollow structure further includes a second soft body; the second soft body is in a semi-circular strip shape and arranged on a free end face of the first straight arm.

Further, the through hole is an elliptical through hole, and an angle between a plane on which a long axis of the through hole is located and the horizontal plane is 45°.

Further, a width of the first end of the soft structure is smaller than that of the second end.

Further, metal skeletons are provided in both the strip-shaped member and the U-shape d groove.

Further, the through hole is an elliptical through hole, and the wear-resistant layer and the damping layer are provided on two sides of a long axis of the through hole respectively.

Further, a material composition proportion of the wear-resistant layer: coating R400: curing agent XR-5580: water is 100:8.8.

Compared with the prior art, the beneficial effect of the present application is as follows. A soft structure with a long strip shape is provided at the inner side of the second straight arm, the soft structure is provided with a through hole on a first end close to the curved arm. When the clamping strip is inserted into the U-shaped groove, the clamping foot contacts with the second clamping foot contact part provided with the wear-resistant layer and slides into the U-shaped groove. At this time, the grille contact part of the soft structure contacts and fits the air-inlet grille, thereby realizing the elastic contact and fixation of the clamping foot in the U-shaped groove. Because of a soft contact of the soft material, when the soft material fills the gap between the clamping strip and the U-shaped groove, so that the sealing performance between the air-inlet grille and the clamping strip will be better under the filling action of the soft material. There will be no leak water and be not easy to produce abnormal sound and noise.

Further, the actual structures of the first clamping foot contact part, the second clamping foot contact part, the grille contact part and the smooth transition part in the soft structure are adjusted according to the actual thickness of the wear-resistant layer and the damping layer. Because the soft structure is easy to deform, the shape and curvature of the soft structure are more in line with the current application state of the clamping strip assembly, so as to achieve a better sealing effect. The hollow soft structure will present different forms according to different usage conditions to satisfy the sealing of the air-inlet grille and the front windshield.

DETAILED DESCRIPTION OF PREFERRED EMBODIMENTS

In order to make the purpose and advantages of the present application clearer, the following further describes embodiments of the present application. It should be understood that the specific embodiments described here are only used to explain the present application, and are not used to limit the present application.

The preferred embodiments of the present application will be described below with reference to the drawings. Those skilled in the art should understand that these embodiments are only used to explain the technical principles of the present application, and are not intended to limit the protection scope of the present application.

It should be noted that in the description of the present application, the terms "upper", "lower", "left", "right", "inner", "outer" and other terms indicating directions or positional relationships are based on the drawings. The directions or position relationships shown are only for ease of description, and does not indicate or imply that the device or element must have a specific orientation, be configured and operated in the specific orientation. Therefore, the terms cannot be understood as a limitation of the present application.

In addition, it should be noted that, in the description of the present application, unless otherwise clearly specified and defined, the terms "installation", "connection", and "join" should be understood in a broad sense. For example, "connection" may be a fixed connection or a detachable connection or an integral connection; it may be a mechanical connection or an electrical connection; it may be a direct connection, or an indirect connection through an intermediate medium, or it may be an internal communication between two components. For those skilled in the art, the specific meaning of the above-mentioned terms in the present application can be understood according to specific circumstances.

Figure 1:
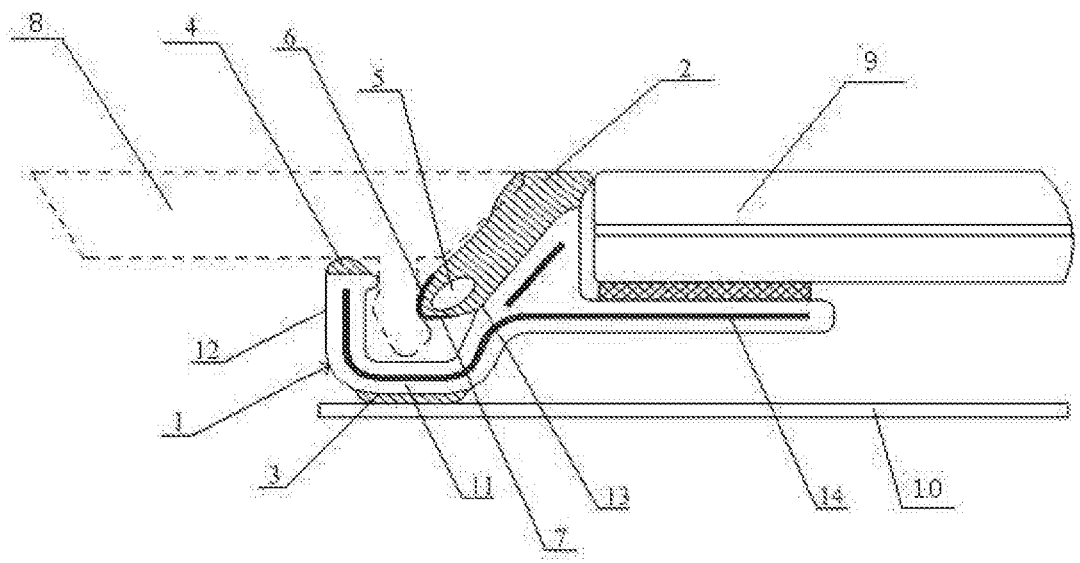
FIG. 1 is a schematic structural diagram of an automobile air-inlet grille sealing strip with a soft hollow structure provided by an embodiment of the present application.
Figure 2:
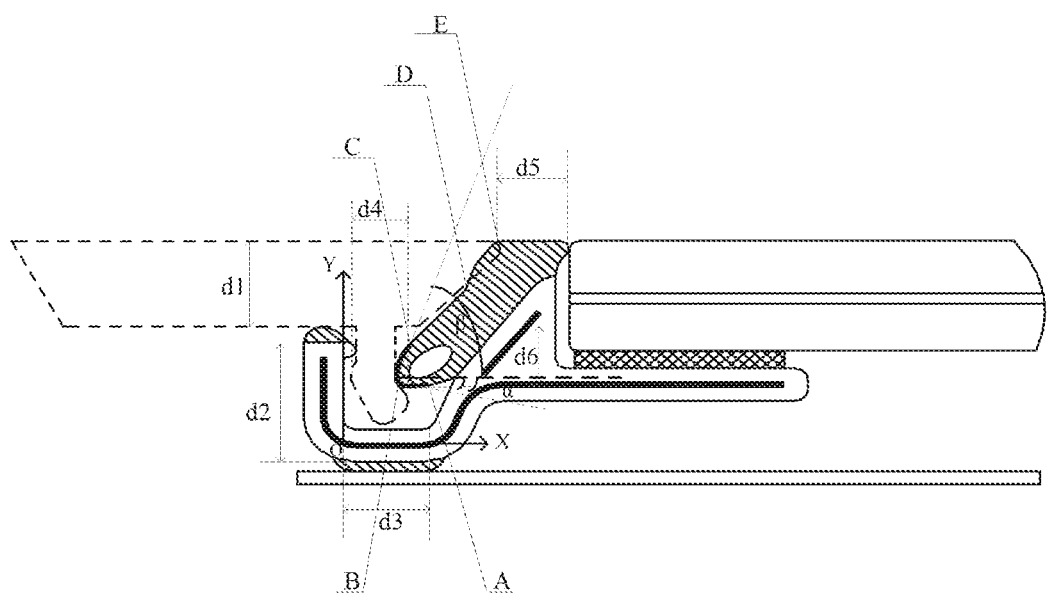
FIG. 2 is a schematic diagram of a size and structure of the automobile air-inlet grille sealing strip with a soft hollow structure provided by an embodiment of the present application.

Please refer to FIGS. 1 and 2, the automobile air-inlet grille sealing strip with a soft hollow structure provided by an embodiment of the present application includes a clamping strip 1 and a soft structure 2, wherein a part or all of the soft structure 2 are arranged in an inner space of the clamping strip 1 so that an air-inlet grille 8 and a front windshield 9 are spaced apart so as to avoid hard contact and damaging the air-inlet grille 8 and/or the front windshield 9.

Continuing to refer to FIG. 1, the clamping strip 1 includes a strip-shaped member 14 and a U-shaped groove. The strip-shaped member 14 and the U-shaped groove are integrally formed. The clamping strip 1 is configured to isolate the air-inlet grille 8 from a vehicle body sheet metal 10. The U-shaped groove includes a curved arm 11 and a first straight arm 12 and a second straight arm 13 arranged at two ends of the curved arm. An inner side of the second straight arm 13 is provided with a relatively inclined smooth transitional curved surface, and the U-shaped groove extends outward along an opening direction of the second straight arm 13. The soft structure 2 is arranged on the inner side of the second straight arm 13, and the soft structure 2 is in a long strip shape. The soft structure 2 is provided with a through hole 5 on a first end close to the curved arm 11. The soft structure 2 includes a first clamping foot contact part, a second clamping foot contact part, a smooth transition part and a grille contact part. A starting point of the first clamping foot contact part is A, a connection point of the first clamping foot contact part and the second clamping foot contact part is B, a connection point of the second clamping foot contact part and the smooth transition part is C, a connection point of the smooth transition part and the grille contact part is D, an end point of the grille contact part is E. The first clamping foot contact part, the second clamping foot contact part and the grille contact part all have arc-shaped cross-sections. The cross-section of the smooth transition part is a straight line. The first clamping foot contact part is provided with a damping layer 7, and the second clamping foot contact part is provided with a wear-resistant layer 6.

In the automobile air-inlet grille sealing strip with a soft hollow structure provided by the embodiment of the present application, an soft structure with a long strip shape is arranged at the inner side of the second straight arm, and the soft structure is provided with a through hole on the first end close to the curved arm. During the process of inserting the clamping strip into the U-shaped groove, a clamping foot contacts with the second clamping foot contact part provided with the wear-resistant layer 6 and slides into the U-shaped groove. At this time, a grille contact part of the soft structure contacts and fits the air-inlet grille 8 to realize an elastic contact fixation of the clamping foot in the U-shaped groove. Because of a soft contact of a soft material, the soft material can be filled in a gap between the clamping strip and the U-shaped groove, and it is hard to produce abnormal sound and noise.

Specifically, the clamping strip 1 provided by the embodiment of the present application includes the strip-shaped member 14 and the U-shaped groove. The strip-shaped member 14 and the U-shaped groove are integrally formed. The U-shaped groove includes the curved arm 11 and the first straight arm 12 and the second straight arm 13 respectively arranged at two ends of the curved arm. The inner side of the second straight arm 13 is provided with a relatively inclined smooth transitional curved surface, and the U-shaped groove extends outward along an opening direction of the second straight arm 13. The setting of the U-shaped groove is convenient for the insertion of the clamping foot. The clamping foot 8 is usually inserted into the U-shaped groove of the clamping strip. In order to prevent the clamping foot from getting out of the U-shaped groove, the sealing strip provided by the embodiment of the present application further includes the soft structure 2. The soft structure 2 is arranged at the inner side of the second straight arm 13. The soft structure is in a long strip shape, and the soft structure 2 is provided with a through hole 5 on a first end close to the curved arm 11. The soft structure 2 and the second straight arm 13 can be fixedly connected or detachably connected. In the actual application process, if the soft structure is damaged due to long-term friction and other reasons in the long-term use, it can be replaced at any time by means of detachable connection.

Those skilled in the art can understand that the soft structure is configured to reduce the gap between the clamping foot and the U-shaped groove. The soft contact of the soft structure reduces the gap between the clamping foot and the U-shaped groove, thereby achieving a gap-free sealing, no noise and no abnormal sound. The soft structure 2 is in a long strip shape, and the through hole 5 is provided on the first end close to the curved arm. By providing the through hole 5 at the first end of the soft structure, the first end will be deformed when the clamping foot enters the U-shaped groove, which is convenient for the insertion of the clamping foot. When the clamping strip is inserted into the U-shaped groove, in order to prevent the clamping foot from getting out, the soft structure 2 will be deformed if the clamping foot slides out, which prevents the clamping foot from getting out, makes it difficult for the clamping foot to get out from the U-shaped groove.

Specifically, the soft structure 2 includes the first clamping foot contact part, the second clamping foot contact part, the smooth transition part and the grille contact part. The starting point of the first clamping foot contact part is A, the connection point of the first clamping foot contact part and the second clamping foot contact part is B, the connection point of the second clamping foot contact part and the smooth transition part is C, the connection point of the smooth transition part and the grille contact part is D, and the end point of the grille contact part is E. The first clamping foot contact part, the second clamping foot contact part and the grille contact part all have arc-shaped cross-sections. The cross-section of the smooth transition part is a straight line. The first clamping foot contact part is provided with a damping layer 7, and the second clamping foot contact part is provided with a wear-resistant layer 6.

Wherein, a curve formula of the first clamping foot contact part is:

$$Y1 = a0 * \ln\frac{d6}{d3} + \sin\left(\alpha + \frac{d}{d1}\right) + x0 + y0, \tag{1}$$

in the formula, d6 is a contactable length between the clamping foot of the air-inlet grille and the soft structure, d3 is a width of the U-shaped groove, and α is an angle between a straight line formed by two end points of the first clamping foot contact part and the horizontal plane, as shown in FIG. 2; d is a thickness of the damping layer 7, d1 is a thickness of the air-inlet grille; a0 is a constant coefficient, indicating a degree of the curve away from the X axis, and x0 and y0 are both constants. In the coordinate system as shown in FIG. 2, x0 and y0 are offset of the horizontal and vertical coordinates of the first clamping foot contact part relative to the coordinate origin 0.

Specifically, in the present application, a section of the soft structure provided with the damping layer is set as a curved structure that is bent towards a direction of the main body of the soft structure. When the soft structure moves upward, the section of the soft structure first contacts with the clamping foot to reduce the damage to the soft structure; and as the contact force between the section of the soft structure and the clamping foot changes, the curvature and length of the section also change. The greater the contact force between the section and the clamping foot, the greater the amount of deformation, the greater the curvature of Y1, and the greater the angle.

Specifically, the arc curve formula of the second clamping foot contact part is $$Y2 = \log\frac{d4}{f}\left(\frac{d3}{d4}\right) + \cos\left(\beta + \frac{d4}{f}\right) + x1 + y1, \tag{2}$$

In the formula, d4 is a longest horizontal width of the clamping foot; f is a thickness of the wear-resistant layer 6; d3 is a width of the U-shaped groove; β is an angle between a straight line formed by two end points of the second clamping foot contact part and the horizontal plane, as shown in FIG. 2; x1 and y1 are both constants; in the coordinate system as shown in FIG. 2, x1 and y1 are offset of the horizontal and vertical coordinates of the second clamping foot contact part relative to the coordinate origin 0.

Specifically, in the present application, a section of the soft structure provided with the wear-resistant layer is set as a curved structure that is bent away from the main body of the soft structure. When the clamping foot is inserted into the U-shaped groove, the clamping foot is in contact with this section of the soft structure. When the clamping foot is pressed downwards, this section of the soft structure will deform and be stretched, so that the angle between the straight line formed by the two end points of the second clamping foot contact part and the horizontal plane will increase, and the curvature of Y2 will be smaller. With different forces, this section of the soft structure will also deform adaptively to meet the current force state and application scenarios.

A straight line formula of the smooth transition part is $$Y3 = d1 * x + k, \quad (3)$$

wherein, d1 is a thickness of the air-inlet grille, x takes a value of 0.1-0.5, and k is a constant. In the coordinate system as shown in FIG. 2, k is an offset, which can specifically be the distance between the smooth transition part and the coordinate origin 0. Since the smooth transition part is a small segment and a continuous straight line, so the abscissa value is 0.1-0.5.

Specifically, the straight line formula of the smooth transition part is a continuous straight line, which realizes the connection between the second clamping foot contact part and the grille contact part, and is positively related to the thickness d1 of the air-inlet grille. The larger the d1, the longer the distance Y3 from the origin of the coordinate. x is a linear continuous line segment, so Y3 is also a line segment. A straight line is used as a transition between the second clamping foot contact part and the grille contact part. The straight line of the smooth transition part of the soft structure is positively related to the thickness of the air-inlet grille. As the thickness of the air-inlet grille changes, the straight line of the smooth transition part of the soft structure changes accordingly, which can adapt to different grille thicknesses better, so that the overall soft structure better fits the air-inlet grille.

An arc curve formula of the grille contact part is $$Y4 = \log \frac{dr}{d1} \left( \frac{d1}{d5} + \frac{p1}{p0} \right), \quad (4)$$

wherein, dr is a straight-line distance between D and E, d1 is a thickness of the air-inlet grille, d5 is a width of the soft structure, p1 is an actual elastic modulus of the soft structure material, and p0 is a preset elastic modulus.

Specifically, after the clamping foot is inserted into the U-shaped groove, the grille contact part on the soft structure contacts with the air-inlet grille, and the grille contact part of the soft structure deforms. The larger the deformation of the arc curve Y4, which means that the interference fit is tighter, and the larger the actual elastic modulus of p1, the smaller the width d5 of the soft structure; and the straight-line distance dr between D and E will also change adaptively. Through the subtle changes of the above-mentioned variables, the curve of the grille contact part adapts to the above-mentioned subtle changes, and better fits the air-inlet grille to achieve an interference fit.

The soft structure of the sealing strip provided by the embodiment of the present application further includes the first clamping foot contact part, the second clamping foot contact part, the smooth transition part and the grille contact part. The first clamping foot contact part is a contact part between the clamping foot and the soft structure when the clamping foot gets out of the U-shaped groove; the second clamping foot contact part is a contact part between the clamping foot and the soft structure when the clamping foot is inserted into the U-shaped groove; and the grille contact part is a contact part between the soft structure and air-inlet grille; and the smooth transition part is configured to connect the grille contact part and the second clamping foot contact part. In order to prevent the clamping foot from getting out of the U-shaped groove, the first clamping foot contact part is provided with the damping layer 7. In order to prevent the clamping foot from damaging the soft structure caused by the resistance friction when the clamping foot is inserted into the U-shaped groove, the second clamping foot contact part is provided with the wear-resistant layer 6. In addition, the arc curve formula of the first clamping foot contact part is Y1. The arc curve of the first clamping foot contact part positively relates to the angle between the straight line formed by two end points of the first clamping foot contact part and the horizontal plane. Y1 is also related to the width of the U-shaped groove and the contactable length between the clamping foot and the soft structure, and the thickness of the damping layer 7 will also affect the arc curve of the first clamping foot contact part. Specifically, the thicker the damping layer 7, the smaller the curvature of Y1, otherwise the curvature will be larger, which is consistent with the effect in the actual application process. Of course, the arc curve Y2 of the second clamping foot contact part is related to the thickness of the wear-resistant layer 6, and also related to the angle between the straight line formed by the two end points of the second clamping foot contact part and the horizontal plane. It can be understood by those skilled in the art that the thicker the wear-resistant layer 6, the smoother the second clamping foot contact part, and otherwise, the greater the amount of deformation. The straight line formula Y3 of the smooth transition part is related to the thickness of the air-inlet grille, and the arc curve Y4 of the grille contact part is related to the width of the soft structure and the actual elastic modulus of the soft structure.

Specifically, when assembling the clamping foot of the air-inlet grille 8, the clamping foot is inserted into the U-shaped groove of the clamping strip. Since the overall width of the clamping foot is greater than the opening width of the U-shaped groove, the soft hollow structure in the U-shaped groove is elastically deformed during the insertion process of the clamping foot. The wear-resistant layer 6 is provided on the first side of the first end of the soft structure, which reduces the insertion force during the assembly process and facilitates the assembly of the air-inlet grille 8. Adding a wear-resistant layer can reduce the wear on this part after repeated disassembly and assembly, and prolong the service life of the clamping foot.

A damping layer 7 is provided on the second side of the first end to increase the frictional resistance between the clamping foot and the soft structure. When the clamping foot moves upward, the soft structure is deformed in the opposite direction, so that the aspect ratio of the through hole of the soft structure and the angle becomes smaller, so that the clamping foot is not easy to get out after being assembled with the clamping strip, and the release force of the clamping foot and clamping strip is also increased to ensure the stability of the assembly.

Specifically, the sealing strip provided by the embodiment of the present application further includes a first soft body 3, and the first soft body 3 is in a long sheet shape and arranged on the outer side of the curved arm. By arranging the first soft body 3, the first soft body abuts against the vehicle body sheet metal 10, and the vehicle body sheet metal 10 is used to increase the reliability of the installation of the clamping strip and the air-inlet grille 8. The soft body 3 with the long sheet shape makes the connection area between the vehicle body sheet metal 10 and the clamping strip larger, and the connection reliability is stronger and more stable. Those skilled in the art can understand that the function of the first soft body 3 is to connect the clamping strip and the vehicle body sheet metal 10. The first soft body 3 that realizes the above functions can be in the shape of a long sheet or spaced apart points or strips arranged at intervals, or any shape that can realize a soft connection, and there is no particular limitation.

The clamping strip assembly provided in the embodiment of the present application further includes a second soft body 4 which is in a semi-circular strip shape and arranged on a free end face of the first straight arm 12.

Specifically, the second soft body 4 is arranged on the free end face of the first straight arm 12 to support the back of the air-inlet grille 8 of air-conditioner of the automobile, which improves the tightness between the air-inlet grille and the first straight arm 12 of the clamping strip, and prevents water leakage and also increases the stability of the sealing strip.

The through hole 5 is an elliptical through hole, and the angle between the plane on which the long axis of the through hole is located and the horizontal plane is 45°.

Specifically, the first end of the soft structure 2 is provided with the through hole 5, and the purpose of the through hole 5 is to deform when the clamping strip is inserted, facilitate the insertion of the clamping strip, and reduce the difficulty of insertion. It is understood by those skilled in the art that the through hole 5 on the soft structure 2 can be of any shape, such as a circular through hole, a square through hole, or a polygonal through hole, etc. The through hole 5 provided in the embodiment of the present application can optionally be an elliptical through hole. The angle between the plane where the long axis of the through hole is located and the horizontal plane is 45°. By setting the angle of 45°, it is more convenient for the deformation of the clamping strip during insertion, and the deformation of the elliptical through hole is easy to realize, and the insertion resistance is reduced. Because the deformation is easy to realize, the clamping strip is easier to insert into the U-shaped groove, which is convenient for installation.

The width of the first end of the soft structure is smaller than the width of the second end.

Specifically, the width of the first end of the soft structure 2 in the sealing strip provided by the embodiment of the present application is smaller than the width of the second end. Those skilled in the art can understand that the first end of the soft structure is provided with a through hole which is close to the bottom of the U-shaped groove. The main function of the first end of the soft structure is to reduce the difficulty of inserting the clamping foot. In actual use, the function of the second end of the soft structure is to achieve soft contact with the air-inlet grille, and further protect the air-inlet grille and prevent physical damage caused by contact with the front windshield. The second end must be set with sufficient width to separate the air-inlet grille and the front windshield. The second end is interference fit with the air-inlet grille 8. The soft structure is an elastic member, it will compress or stretch under the action of external force during use. Those skilled in the art can understand that the soft structure in the embodiment of the present application needs to ensure that there is a certain distance between the air-inlet grille and the front windshield even when it is compressed to the limit. In the embodiment of the present application, the width of the second end is preferably greater than the width of the first end, which is convenient to maintain the distance between the air-inlet grille and the front windshield when the soft structure is compressed to the limit, so that no hard contact occurs, and the air-inlet grille and the front windshield will not be physically damaged.

Both of the strip-shaped member and the U-shaped groove are provided with metal skeletons.

Specifically, the clamping strip 1 plays a supporting role in the sealing strip, and it is also a component that separates the hard contact of each part. Therefore, the structure of the clamping strip 1 requires a certain strength to be able to play the supporting role. In the embodiment of the present application, the strip-shaped member of the clamping strip 1 and the U-shaped groove are both provided with metal skeletons. The metal skeleton is wrapped in the clamping strip 1. The metal skeleton can strengthen the support strength of the clamping strip 1, and is not easy to be damaged, extend the service life of the clamping strip. Those skilled in the art can understand that, an alloy skeleton or other skeleton with a certain hardness can also be used as a support except the metal skeleton. The material of the clamping strip can be rigid PVC or PP.

The through hole 5 is an elliptical through hole, and the wear-resistant layer 6 and the damping layer 7 are arranged on two sides of the long axis of the through hole.

Figure 4:
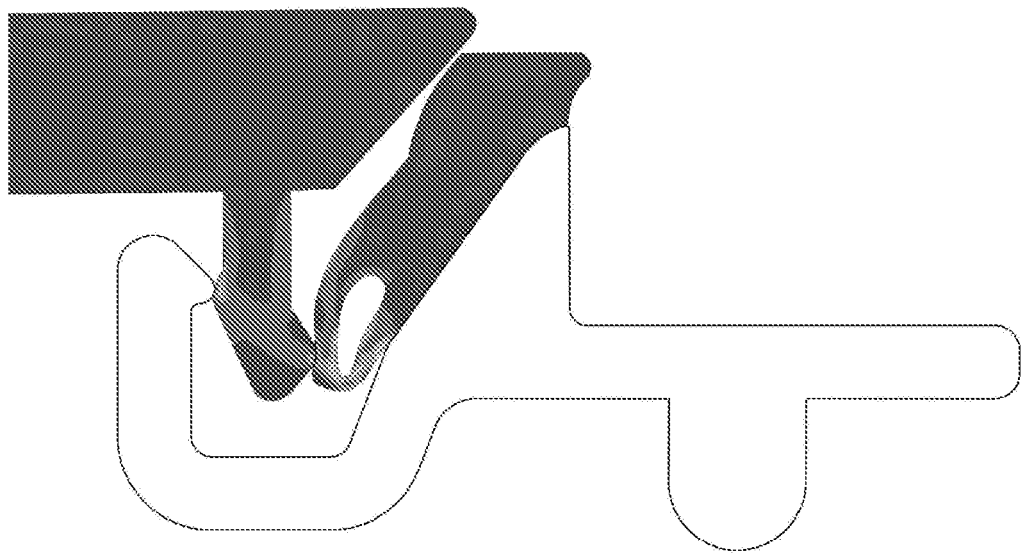
FIG. 4 is a first use state diagram of the automobile air-inlet grille sealing strip with a soft hollow structure provided by an embodiment of the present application.
Figure 5:
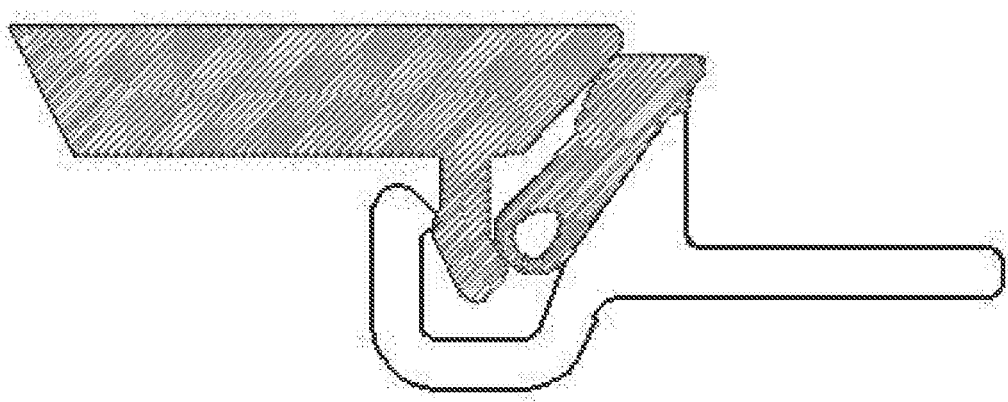
FIG. 5 is a second use state diagram of the automobile air-inlet grille sealing strip with a soft hollow structure provided by an embodiment of the present application.

Specifically, the through hole 5 in the clamping strip assembly provided by the embodiment of the present application is an elliptical through hole, and the wear-resistant layer 6 and the damping layer 7 are arranged on two sides of the long axis of the through hole. By arranging the wear-resistant layer 6 and the damping layer 7 on two sides of the long axis of the through hole, as shown in FIG. 4, in the process of insertion, the wear-resistant layer contacts with the clamping foot, which reduces the insertion resistance, makes the clamping foot to insert smoothly. In the process of insertion, the wear-resistant layer 6 is stretched, and the wear-resistant layer 6 is arranged on one side of the long axis of the through hole, which makes the clamping foot easy to deform and easy to be inserted. When the clamping foot is inserted into the U-shaped groove, as shown in FIG. 5, the clamping foot will contact the damping layer 7 when it slides upwards. The damping layer is arranged on the other side of the long axis of the through hole. When an external force acts on the damping layer, it is more likely to deform and prevent the clamping foot from getting out. The setting manner of the embodiment of the present application is easier to cause deformation of the first end of the soft structure for smooth insertion or prevention of getting out, no matter during insertion or separation. The structure is simple and easy to implement. The material component proportion of the wear-resistant layer: the ratio of coating R400/curing agent XR-5580/water is 100:8:8. The wear-resistant layer using this component has strong wear resistance and outstanding wear resistance.

Figure 3:
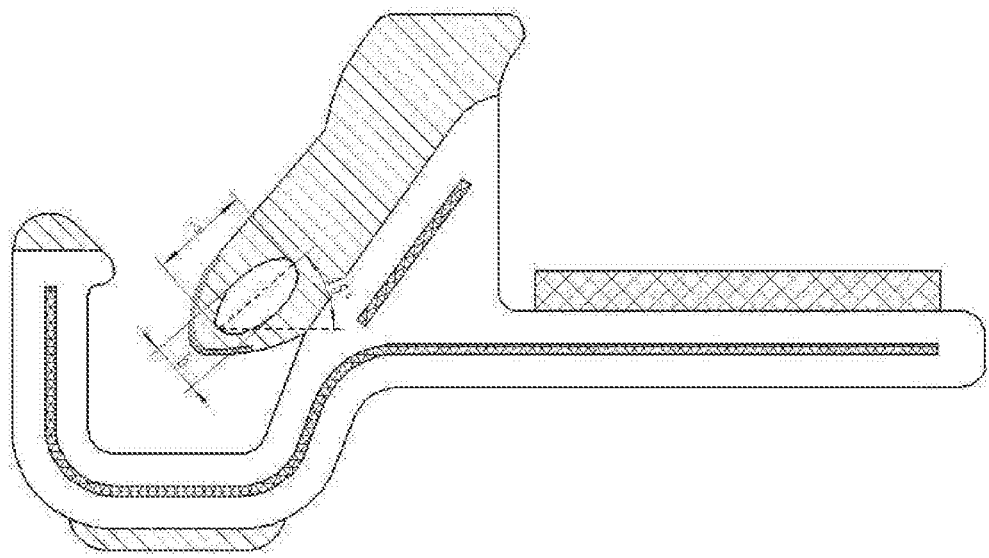
FIG. 3 is a schematic diagram of a soft hollow structure in the automobile air-inlet grille sealing strip with a soft hollow structure provided by an embodiment of the present application.

As shown in FIGS. 3 and 4, the ratio of the major axis and the minor axis of the through hole is 2:1. Specifically, when the air-inlet grille is assembled with the clamping strip, the air-inlet grille will first be contacted with the soft structure of the clamping strip. Because the soft structure of the clamping strip is a hollow structure, the specific shape is that the ratio of the major axis a and the minor axis b is 2:1, and the design inclination angle is 450, elastic deformation will occur, making the aspect ratio and the inclination angle larger. The hollow structure makes the first end easier to deform, which is beneficial to the assembly of the air-inlet grille. After the air-inlet grille is assembled in place, the air-inlet grille 8 and the soft hollow structure of the clamping strip will be closely fitted. There will be no gap. This state can ensure that the air-inlet grille and the clamping strip are completely sealed together, and fully play the role of sound insulation and waterproof.

So far, the technical solutions of the present application have been described in conjunction with the preferred embodiments shown in the drawings. However, it is easy for those skilled in the art to understand that the protection scope of the present application is obviously not limited to these specific embodiments. Without departing from the principle of the present application, those skilled in the art can make equivalent changes or substitutions to the relevant technical features, and the technical solutions after these changes or substitutions will fall within the protection scope of the present application.

The above are only preferred embodiments of the present application and are not used to limit the present application; for those skilled in the art, the present application can have various modifications and changes. Any modification, equivalent replacement, improvement, etc. made within the spirit and principle of the present application should be included in the protection scope of the present application.

What is claimed is:

1. An automobile air-inlet grille sealing strip with a soft hollow structure, comprising: a clamping strip and a soft structure;

the clamping strip comprises a strip-shaped member and a U-shaped groove; the strip-shaped member and the U-shaped groove are integrally formed; the U-shaped groove comprises a curved arm, a first straight arm and a second straight arm; the first straight arm and the second straight arm are arranged at two ends of the curved arm respectively; an inner side of the second straight arm is provided with a relatively inclined smooth transitional curved surface, and the U-shaped groove extends outward along an opening direction of the second straight arm;

the soft structure is provided at the inner side of the second straight arm, the soft structure is in a long strip shape, and the soft structure is provided with a through hole on a first end close to the curved arm;

the soft structure comprises a first clamping foot contact part, a second clamping foot contact part, a smooth transition part and a grille contact part; a starting point of the first clamping foot contact part is A, a connection point of the first clamping foot contact part and the second clamping foot contact part is B, a connection point of the second clamping foot contact part and the smooth transition part is C, a connection point of the smooth transition part and the grille contact part is D, an end point of the grille contact part is E; cross-sections of the first clamping foot contact part, the second clamping foot contact part, and the grille contact part are all arc-shaped, and a cross-section of the smooth transition part is a straight line; the first clamping foot contact part is provided with a damping layer, and the second clamping foot contact part is provided with a wear-resistant layer;

wherein a curve formula of the first clamping foot contact part is $$Y1 = a0 \times \ln\frac{d6}{d3} + \sin\left(\alpha + \frac{d}{d1}\right) + x0 + y0 \quad (1)$$

in the formula (1), d6 is a contactable length between an clamping foot of an air-inlet grille and the soft structure, d3 is a width of the U-shaped groove, and α is an angle between a straight line formed by two end points of the first clamping foot contact part and a horizontal plane, and d is a thickness of the damping layer, d1 is a thickness of the air-inlet grille; a0 is a constant coefficient, and x0 and y0 are both constants;

a curve formula of the second clamping foot contact part is $$Y2 = \log\frac{d4}{f}\left(\frac{d3}{d4}\right) + \cos\left(\beta + \frac{d4}{f}\right) + x1 + y1 \quad (2)$$

in the formula (2), d4 is a longest horizontal width of the clamping foot; f is a thickness of the wear-resistant layer, d3 is the width of the U-shaped groove; β is an angle between a straight line formed by two end points of the second clamping foot contact part and the horizontal plane; x1 and y1 are both constants;

a straight line formula of the smooth transition part is $$Y3 = d1 \times h + k \quad (3)$$

in the formula (3), d1 is the thickness of the air-inlet grille, h takes a value of 0.1-0.5, and k is a constant;

a curve formula of the grille contact part is $$Y4 = \log\frac{dr}{d1}\left(\frac{d1}{d5} + \frac{p1}{p0}\right) \quad (4)$$

in the formula (4), dr is a straight-line distance between D and E, d1 is the thickness of the air-inlet grille, d5 is a width of the soft structure, p1 is an actual elastic modulus of a soft structure material, and p0 is a preset elastic modulus.

2. The automobile air-inlet grille sealing strip with a soft hollow structure according to claim 1, wherein the wear-resistant layer is arranged on a first side of the first end, and the damping layer is arranged on a second side of the first end; and the second side and the first side are arranged opposite to each other.

3. The automobile air-inlet grille sealing strip with a soft hollow structure according to claim 2, further comprising a first soft body; the first soft body is in a long sheet shape and arranged on an outer side of the curved arm.

4. The automobile air-inlet grille sealing strip with a soft hollow structure according to claim 3, further comprising a second soft body, the second soft body is in a semi-circular strip shape and arranged on a free end face of the first straight arm.

5. The automobile air-inlet grille sealing strip with a soft hollow structure according to claim 1, wherein the through hole is an elliptical through hole, and an angle between a plane on which a long axis of the through hole is located and a horizontal plane is 45°.

6. The automobile air-inlet grille sealing strip with a soft hollow structure according to claim 1, wherein a width of the first end of the soft structure is smaller than that of the second end.

7. The automobile air-inlet grille sealing strip with a soft hollow structure according to claim 1, wherein metal skeletons are provided in both of the strip-shaped member and the U-shaped groove.

8. The automobile air-inlet grille sealing strip with a soft hollow structure according to claim 2, wherein the through hole is an elliptical through hole, and the wear-resistant layer and the damping layer are provided on two sides of a long axis of the through hole respectively.

9. The automobile air-inlet grille sealing strip with a soft hollow structure according to claim 1, wherein a material composition proportion of the wear-resistant layer: coating R400: curing agent XR-5580: water is 100:8:8.

10. The automobile air-inlet grille sealing strip with a soft hollow structure according to claim 2, wherein a material composition proportion of the wear-resistant layer: coating R400: curing agent XR-5580: water is 100:8:8.

11. The automobile air-inlet grille sealing strip with a soft hollow structure according to claim 3, wherein a material composition proportion of the wear-resistant layer: coating R400: curing agent XR-5580: water is 100:8:8.

12. The automobile air-inlet grille sealing strip with a soft hollow structure according to claim 4, wherein a material composition proportion of the wear-resistant layer: coating R400: curing agent XR-5580: water is 100:8:8.

13. The automobile air-inlet grille sealing strip with a soft hollow structure according to claim 5, wherein a material composition proportion of the wear-resistant layer: coating R400: curing agent XR-5580: water is 100:8:8.

14. The automobile air-inlet grille sealing strip with a soft hollow structure according to claim 6, wherein a material composition proportion of the wear-resistant layer: coating R400: curing agent XR-5580: water is 100:8:8.

15. The automobile air-inlet grille sealing strip with a soft hollow structure according to claim 7, wherein a material composition proportion of the wear-resistant layer: coating R400: curing agent XR-5580: water is 100:8:8.

16. The automobile air-inlet grille sealing strip with a soft hollow structure according to claim 8, wherein a material composition proportion of the wear-resistant layer: coating R400: curing agent XR-5580: water is 100:8:8.

\* \* \* \* \*